United States Patent Office 3,143,518
Patented Aug. 4, 1964

3,143,518
HOT MELT POLYVINYL ALCOHOL ADHESIVE
PLASTICIZED WITH PROPYLENE GLYCOL
Vincent M. Smith, Bayport, and Robert J. Stirn, Garden City, N.Y., assignors to United Resin Products Inc., Brooklyn, N.Y., a corporation of New York
No Drawing. Filed June 21, 1963, Ser. No. 289,751
5 Claims. (Cl. 260—33.4)

This invention relates to adhesive coated sheets and more particularly concerns sheets bearing a coating of dried adhesive which may be reactivated by moistening with water or other suitable liquid.

Various paper products, such as envelopes, tapes, stamps and the like, are coated with adhesives originally dissolved or suspended in water and the coating dried to form the finished product, ready for use. The use of water soluble adhesives on such paper products presents a number of disadvantages, in terms of the coating equipment, and the extensive drier means for drying the freshly applied adhesive coating. Such drying operation tends to retard the production rate of the coating equipment.

Accordingly, an object of this invention is to provide an improved adhesive coated sheet wherein the adhesive is derived from a hot melt type of adhesive rather than water solutions or water suspensions, thereby eliminating the need for dryers and thus substantially increasing the rate of production of the adhesive coated sheets.

Another object of this invention is to provide an improved adhesive coated paper, wherein the adhesive is of a thermoplastic, hot melt type; the coated sheet having distinct anti-curl properties, being stable in a flat condition under conditions of relatively high humidity; and being resistant to blocking when such coated papers are stacked in storage under varying conditions of humidity.

While thermoplastic resins are well known in the art, including resins of the polyvinyl type, only polyvinyl alcohol, which is water soluble, has been utilized in forming water remoistenable adhesive sheets. Of course, such adhesives compounded with various other adhesives and modifiers, requires extensive dryer installations to dry the freshly coated sheets, envelopes or the like.

It has now been found that polyvinyl alcohol may be formulated to provide a hot melt, rather than water soluble type of adhesive; and such hot melt adhesive may be readily and quickly applied to a paper base to provide a remoistenable adhesive coating.

Thus, when polyvinyl alcohol of selected molecular weights is combined with a selected plasticizer, a hot melt adhesive is produced which has an optimum viscosity allowing for rapid application as a coating to a base sheet; the resultant product being readily reactivated by moistening and the bond produced by the adhesive being excellent.

The polyvinyl alcohol used in making the hot melt adhesive has a molecular weight of the order of 9,000 to 12,000, preferably about 10,000 and has a partial hydrolysis value of the order of 72.9 to 79.0%. When such polyvinyl alcohol is combined with propylene glycol in selected proportions, an adhesive is attained having a viscosity of about 4,000 c.p.s. at 250°–300° F. Such adhesive displayed optimum properties in its application to the selected paper base and as a resultant bonding agent under extreme conditions of use.

By way of example, polyvinyl alcohol having a molecular weight of 10,000 was combined with propylene glycol in the proportion of 72 parts of the PVA and 28 parts of the glycol, by weight. The propylene glycol was heated to 200° F. and the polyvinyl alcohol was added slowly thereto with constant agitation.

The resultant adhesive, with an addition of a small amount of sodium benzoate (0.5 part by weight) was cast into bars or sheets of desired size. The coating of paper with such adhesive involves heating the solid adhesive to a temperature of the order of from 250° F. to 350° F. and applying the same by conventional hot melt applicator means, to the paper base.

The hot melt adhesive of the instant invention is readily applicable to kraft paper, 100% rag bond paper, 25% rag bond paper, lightweight papers, india paper and the like. Excellent bonds were obtained with such adhesives which showed good adhesion values when tested one minute and 24 hours after the bonding operation.

It has been found that the propylene glycol content of the adhesive formulation should not exceed 35% by weight and should constitute at least 25% by weight of the formulation, the remainder being polyvinyl alcohol of the indicated molecular weight.

It will be apparent that the hot melt adhesive of the instant invention avoids the objectionable maintenance and start up operations mandatory in water soluble adhesive coaters where residual adhesive must be cleaned out of the coating equipment.

Also, the hot melt formulation of the instant invention is productive of glue lines showing excellent flexibility and superior cold flow properties. Thus, the adhesive of the instant invention is particularly adapted for application to envelope flaps, stamps, tapes and the like, providing for substantial economies in production and giving rise to superior end products.

As various changes might be made in the embodiments of the invention as disclosed herein without departing from the spirit thereof, it is understood that all matter herein set forth shall be deemed illustrative and not by way of limitation except as set forth in the appended claims.

What is claimed is:

1. An adhesive coated sheet comprising a cellulosic paper and a hot melt coating of water remoistenable adhesive on one surface of said paper, said adhesive consisting essentially of from 65 to 75 parts of polyvinyl alcohol having a partial hydrolysis value of from 72.9% to 79.0% and a molecular weight of from 9,000 to 12,000, and from 35 to 25 parts of propylene glycol, all by weight.

2. An adhesive coated sheet as in claim 1 wherein said adhesive comprises 72 parts of polyvinyl alcohol and 28 parts of propylene glycol.

3. An adhesive coated sheet comprising paper and a hot melt coating of a water remoistenable adhesive of a viscosity of 4,000 c.p.s. at 250°–300° F. on one surface of said paper, said adhesive consisting of about 2 parts of polyvinyl alcohol of a partial hydrolysis value of from 72.9% to 79.0% and a molecular weight of about 10,000 and about 1 part of propylene glycol, all by weight.

4. A hot melt adhesive applicable in anhydrous form to paper and reactivated by moistening with water, said adhesive consisting essentially of from 65 to 75 parts of polyvinyl alcohol having a partial hydrolysis value of from 72.9% to 79.0% and a molecular weight of from about 9,000 to about 12,000, and from 35 to 25 parts of propylene glycol, all by weight.

5. A hot melt adhesive as in claim 4 wherein said adhesive consists of 72 parts of said polyvinyl alcohol and 28 parts of propylene glycol.

References Cited in the file of this patent

UNITED STATES PATENTS

| | | |
|---|---|---|
| 2,127,896 | Vohrer | Aug. 23, 1938 |
| 2,594,498 | Rohn | Apr. 29, 1952 |
| 2,664,366 | Wilson | Dec. 29, 1953 |
| 2,804,395 | Boyajian | Aug. 27, 1957 |
| 3,104,179 | Prior | Sept. 17, 1963 |

FOREIGN PATENTS

| | | |
|---|---|---|
| 521,402 | Italy | Mar. 29, 1955 |